United States Patent

Nguyen et al.

Patent Number: 6,163,830
Date of Patent: Dec. 19, 2000

[54] METHOD AND APPARATUS TO IDENTIFY A STORAGE DEVICE WITHIN A DIGITAL SYSTEM

[75] Inventors: Cau L. Nguyen, Fremont; Harini G. Setlur, Cupertino, both of Calif.

[73] Assignee: Intel Corporation, Santa Clara, Calif.

[21] Appl. No.: 09/013,372

[22] Filed: Jan. 26, 1998

[51] Int. Cl.$^7$ .................................................. G06F 12/08
[52] U.S. Cl. ........................ 711/119; 711/120; 711/143; 711/144; 711/145
[58] Field of Search .................. 711/119, 120, 711/121, 143, 145, 144

[56] References Cited

U.S. PATENT DOCUMENTS

| | | | |
|---|---|---|---|
| 5,398,325 | 3/1995 | Chang et al. | 711/3 |
| 5,848,432 | 12/1998 | Hotta et al. | 711/131 |
| 5,893,163 | 4/1999 | Arimilli et al. | 711/153 |
| 6,023,746 | 2/2000 | Arimilli et al. | 711/118 |
| 6,055,640 | 4/2000 | Kageshima et al. | 713/320 |

*Primary Examiner*—Hiep T. Nguyen
*Attorney, Agent, or Firm*—Blakely, Sokoloff, Taylor, Zafman LLP

[57] ABSTRACT

An apparatus to identify a storage device of a processor within a digital system is described. The processor includes a first storage device designed to generate a first signal when the first storage device contains a copy of a requested entry in a main storage device. The first signal is in a first state when the copy is of a first type and is in a second state when the copy is of a second type. A second storage device is included that is designed to generate a second signal when the second storage device contains the copy of the requested entry in the main storage device. The second signal is in the first state when the copy is of the first type and is in the second state when the copy is of the second type. The processor also includes a first logic device that generates a first indicator signal in response to receiving the first signal, and is coupled to the first storage device. The indicator signals are representative of the storage device that contains. The processor is also designed such that the first indicator signal is applied to a first pin. A method for identifying a storage device in a processor includes generating a common signal on a bus in a digital system. A first indicator signal is generated in response to receiving a first signal from a first storage device. A second indicator signal is generated in response to receiving a second signal from a second storage device. The processor is identified as the originator of the common signal in response to analyzing the indicator signal and the common signal.

35 Claims, 5 Drawing Sheets

| Hit | HitM | INDICATOR 1 | INDICATOR 2 | Result |
|---|---|---|---|---|
| 0 | 0 | - | - | A |
| 0 | 1 | 0 | 1 | B |
| 1 | 0 | 0 | 1 | C |
| 0 | 1 | 1 | 0 | D |
| 1 | 0 | 1 | 0 | E |
| 0 | 1 | 1 | 1 | F |
| 1 | 0 | 1 | 1 | G |
| 1 | 0 | 0 | 0 | H |
| 0 | 1 | 0 | 0 | I |
| 1 | 1 | 1 | 1 | J |

FIG. 5

METHOD AND APPARATUS TO IDENTIFY A STORAGE DEVICE WITHIN A DIGITAL SYSTEM

BACKGROUND OF THE INVENTION

1. Field of the Invention

The invention relates in general to the field of digital systems, and, more particularly, to storage devices within digital systems. Specifically, the invention relates to a method and apparatus to identify particular storage devices within a digital system.

2. Description of the Related Art

Figure 1:
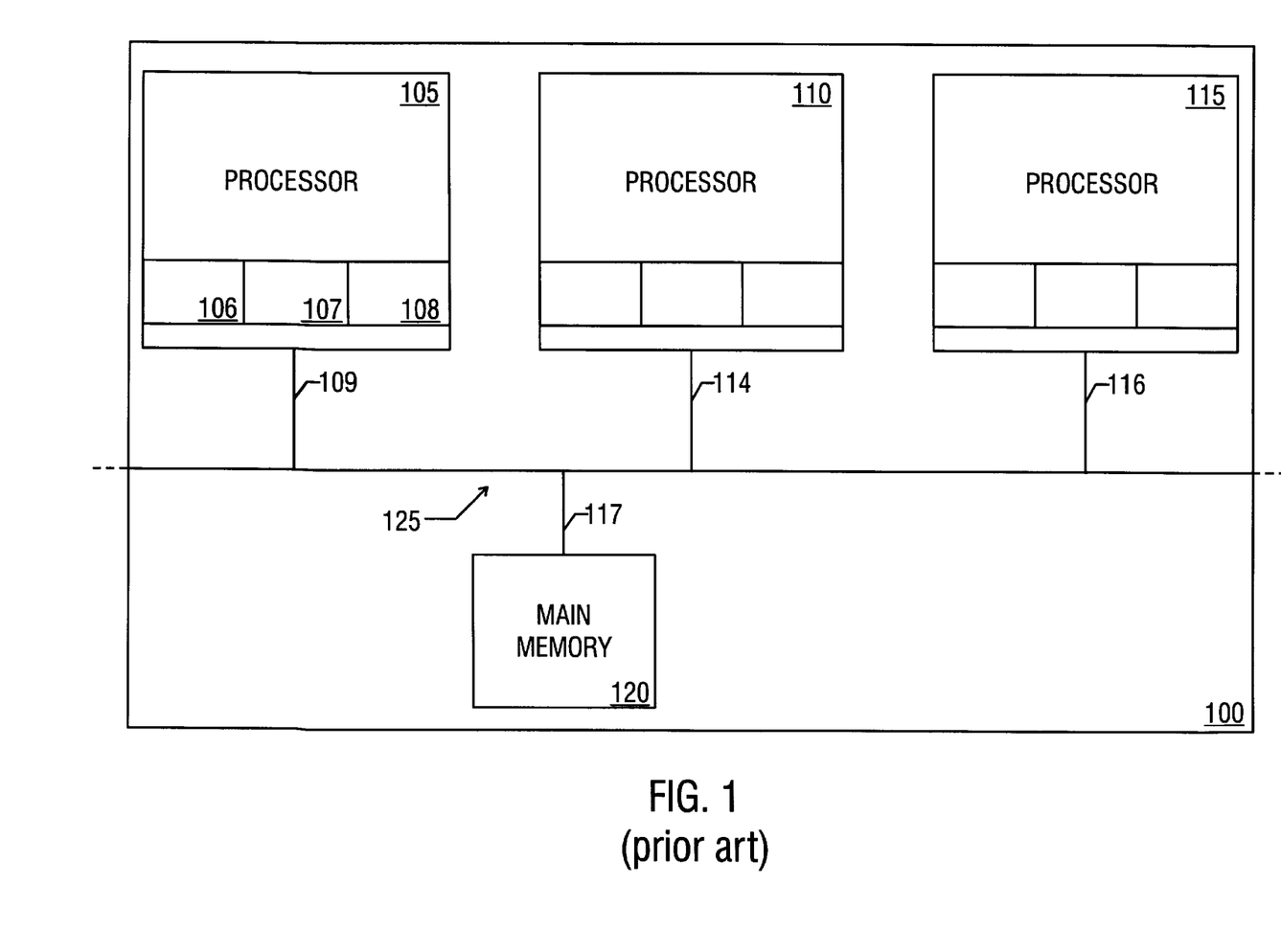
FIG. 1 is a stylized drawing of a portion of a conventional computer system.

The computer system 100 of FIG. 1 includes central processing units 105, 110, 115 that are connected to a main memory 120 through the system bus 125. The system bus 125 is generally several continuous lines with multiple branches (e.g., branches 109, 114, 116, 117). The processors 105, 110, 115 may need to manipulate some data that is stored in the main memory 120. In this case, the processor 105, for example, may apply a request to the system bus 125, and the main memory 120 may respond by applying the requested data to the system bus 125. The processor 105 may store the requested data in local, high-speed storage devices 106–108, such as cache memories. A cache memory controller keeps track of the information copied into the cache memory. When the processor initiates a memory access cycle, the cache controller determines if it has a copy of the requested information in cache memory. If a copy is present, it immediately responds by sending it back to the processor or modifying it within cache memory. This is often referred to as a cache hit.

"Bus snooping" is a method used by cache subsystems to monitor memory accesses performed by other controllers of the bus. The cache controller monitors, or snoops, the system bus when another controller of the bus is performing a memory access.

In a multiprocessor system where there are several processors and several caches within each processor, as shown in FIG. 1, a MESI (Modified Exclusive Shared Invalid) cache protocol may be used to provide a method for tracking the state of a cache line. One of the MESI line states is a modify state in which a cache line contains a more recent copy than the corresponding main memory line. In this case, a modified hit occurs. When either a hit or a modified hit occurs, a hit signal or a hit-modify signal is applied to the system bus. One skilled in the art will appreciate that during normal operation, either a hit or a hit-modify signal is generated, while the generation of neither may be construed as a miss.

Figure 2:
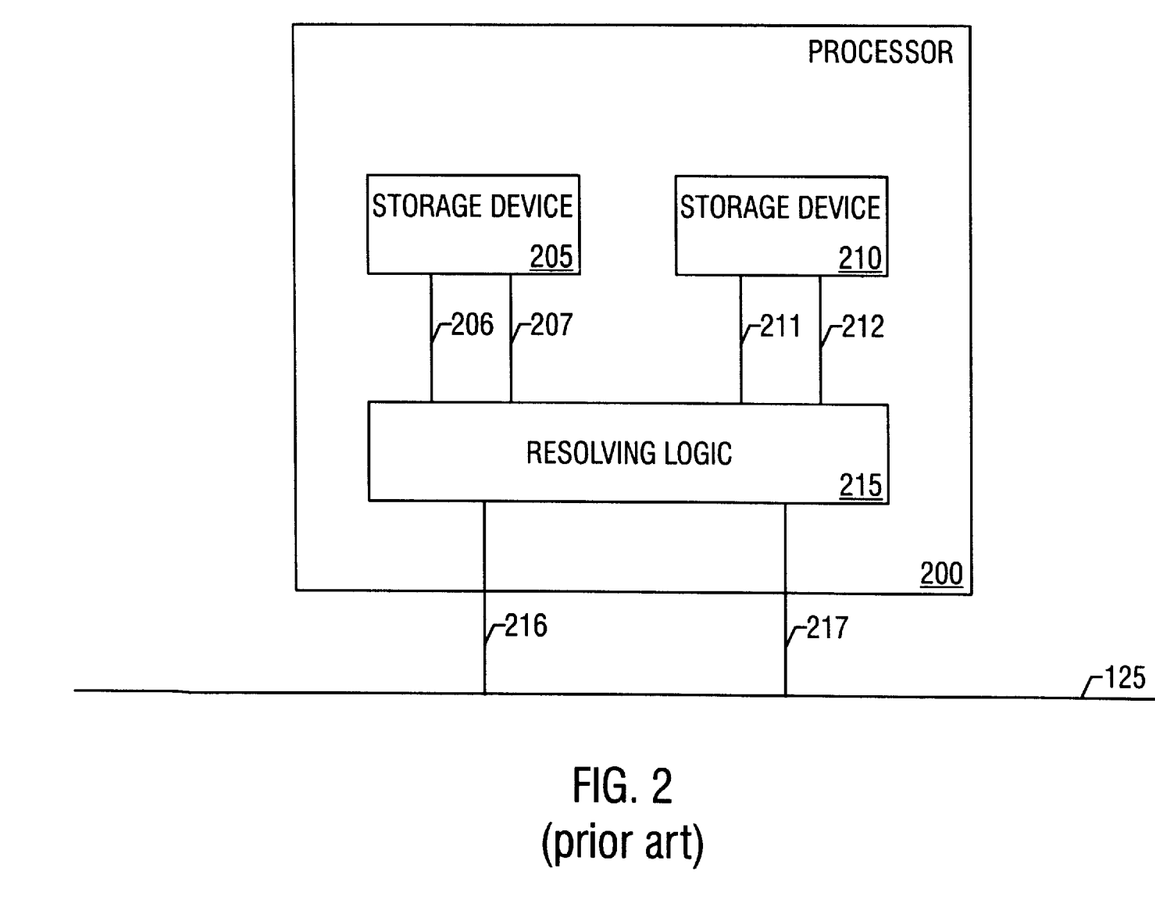
FIG. 2 is an enlarged stylized drawing of a processor.

FIG. 2 illustrates a conventional processor 200 with internal caches 205, 210. The processor 200 is connected to the system bus 125 by lines 216 and 217. The caches 205, 210 generate cache hit signals that are applied to lines 206, 211, respectively. When the caches 205, 210 generate cache hit-modify signals, they are applied to lines 207, 212, respectively. Resolving logic 215 receives the signals generated by the caches 205, 210 and analyzes these signals to determine the valid result to be applied to the system bus 125 via the lines 216, 217. The resolving logic 215 is often employed in multiprocessor systems, such that only one hit or hit-modify signal is applied to the system bus, regardless of the number of caches within a given processor. The signal applied to the line 216 is referred to as a hit-signal instead of a cache hit signal, while the signal applied to the line 217 is referred to as a hit-modify signal.

One skilled in the art will appreciate that the common application of both the hit lines and the hit-modify lines to the system bus hinders identification of the processor and particular internal cache that has a copy of the requested data. For example, the processor 200 may apply a hit-modify signal to the bus 125 and return the requested data. Yet, there is no mechanism to identify that the processor 200 actually generated the hit-modify signal, instead of another processor (not shown). In addition, there is no mechanism to indicate that the cache 205 generated the hit-modify signal and not the cache 210. Thus, it would be beneficial to have a method and apparatus that is capable of overcoming the shortcomings of conventional methods.

SUMMARY OF THE INVENTION

The invention relates to an apparatus to identify a storage device of a processor within a digital system. The processor includes a first storage device designed to generate a first signal when the first storage device contains a copy of a requested entry in a main storage device. The first signal is in a first state when the copy is of a first type and is in a second state when the copy is of a second type. A second storage device is included that generates a second signal when the second storage device contains a copy of the requested entry in the main storage device. The second signal is in the first state when the copy is of the first type and is in the second state when the copy is of the second type. The processor also includes a first logic device that generates an indicator signal in response to receiving the first signal, and second signal and is coupled to the first storage device and the second storage device. The indicator signals are representative of the storage device that contains the copy.

A method for identifying a storage device in a processor includes generating a common signal on a bus in a digital system. A first indicator signal is generated in response to receiving zL first signal from a first storage device. A second indicator signal is generated in response to receiving a second signal from a second storage device. The processor is identified as the originator of the common signal in response to analyzing the indicator signal and the common signal.

BRIEF DESCRIPTION OF THE DRAWINGS

Other objects and advantages of the invention will become apparent upon reading the following detailed description and upon reference to the drawings in which.

While the invention is susceptible to various modifications and alternative forms, specific embodiments have been shown by way of example in the drawings and are described in detail. It should be understood, however, that the description herein of specific embodiments is not intended to limit the invention to the particular forms disclosed. On the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below as they might be employed in a method and apparatus to identify a storage device within a digital system. In the interest of conciseness, not all features of an actual implementation are described in this specification. It will of course be appreciated that in the development of any actual embodiment, numerous implementation-specific decisions must be made to achieve the developer's specific goals, such as compliance with system-related and business-related constraints. Moreover, it will be appreciated that even if such a development effort might be complex and time-consuming, it would nevertheless be a routine undertaking for one of ordinary skill having the benefit of this disclosure.

Overview

Figure 3:
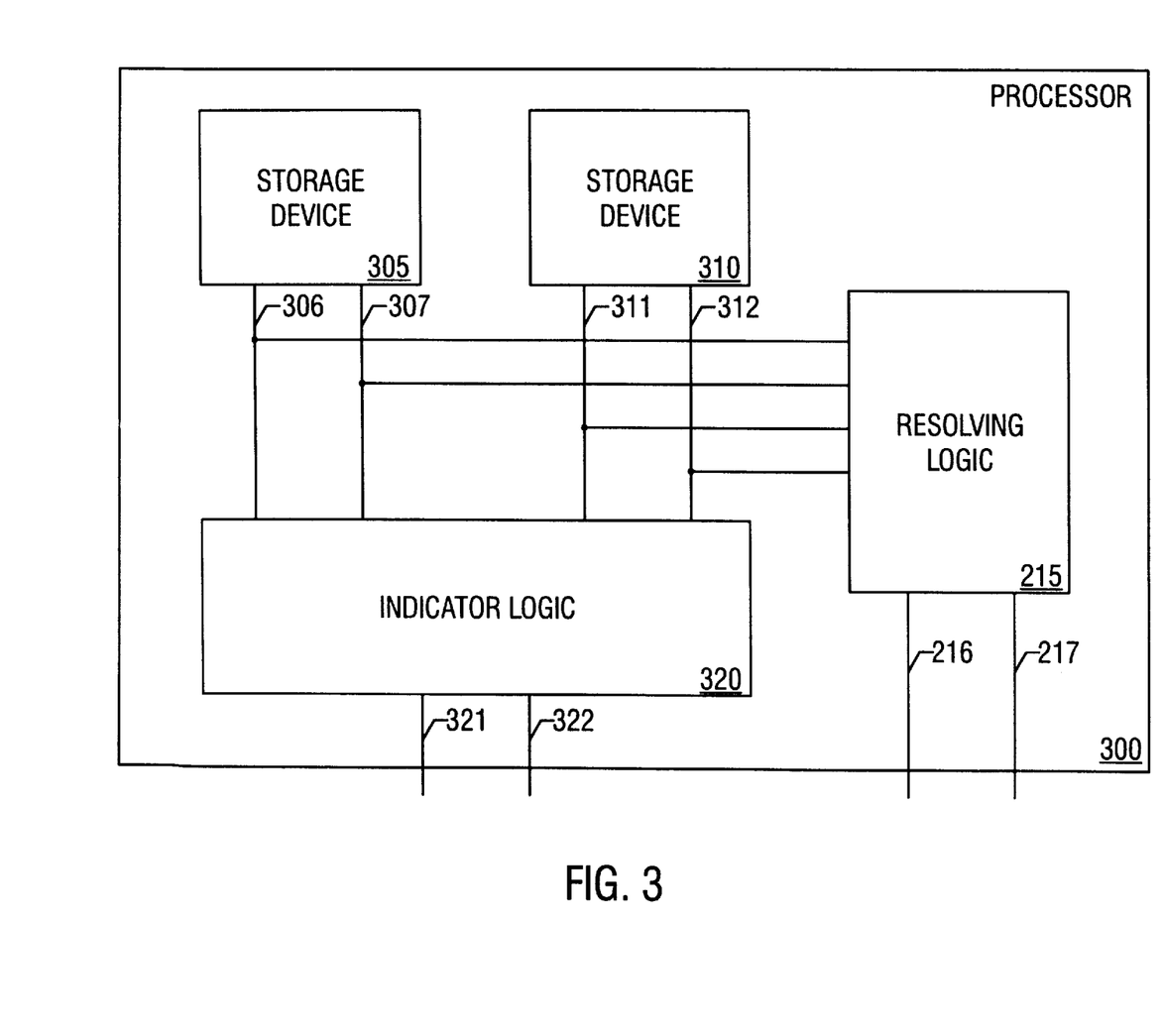
FIG. 3 is a block diagram of a processor in accordance with the invention.

FIG. 3 illustrates a processor 300 with two internal storage devices 305 and 310, which may be static random access cache memories. Though two devices 305, 310 are shown, one or more storage devices may be used without departing from this invention. Each of the storage devices 305, 310 has two lines coupled to the resolving logic 215 and the indicator logic 320. Coupling, as defined in this application, refers to connecting two components together, though it does not necessarily refer to a direct connection.

The conventional resolving logic unit 215 may be used in conjunction with the indicator logic 320 to provide specific information regarding the status of the processor 300. As previously mentioned, cache devices alternatively transmit a cache hit signal and a cache hit-modify signal in response to a bus snoop. The storage device 305 transmits a cache hit signal on a line 306 and a cache hit-modify signal on a line 307. The storage device 310 behaves similarly using the lines 311, 312.

As previously mentioned, the resolving logic 215 processes the signals that it receives from the lines 306, 307, 311, 312 to generate hit and hit-modify signals on the lines 216, 217. Once the hit and hit-modify signals are applied to these lines, they are able to traverse the system bus. The indicator logic 320 also uses the signals applied to the lines 306, 307, 311, 312 to generate first and second indicator signals on lines 321, 322, which are routed to two additional pins. One skilled in the art will appreciate that these two pins may be on the processor 300 or may be on a main circuit board (not shown). The indicator signals, together with the hit and hit-modify signals may be used to identify the particular processor and storage device within the processor that possesses a copy of the requested data.

Specific Embodiments

Figure 4:
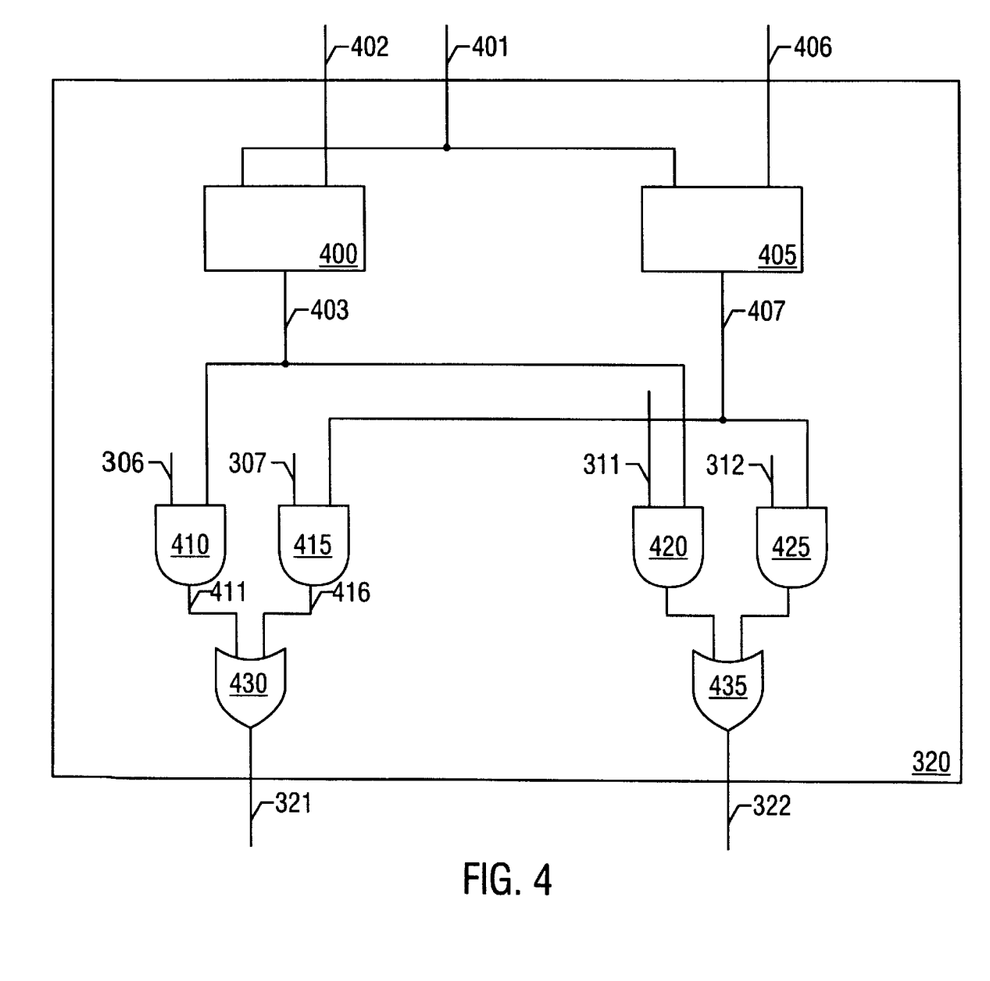
FIG. 4 is a simplified logic diagram for the indicator logic of FIG. 3.

FIG. 4 is a circuit diagram for the indicator logic 320 that includes two buffers 400, 405, which may be D-latches. A clock signal may be applied to a line 401 of the buffers 400, 405. Qualifying signals, which are designed to establish a time frame in which valid data may be routed, are applied to lines 402, 406. One skilled in the art will appreciate that both qualifying signals and a clock signal are generally available within a processor, such that the specifics regarding generation of these signals have not been included. Together, these signals may be used to generate timing signals on the lines 403, 407, which may be used to activate their corresponding logic gates.

AND gates 410, 415 have input terminals coupled to the lines 306, 307, respectively, upon which the cache hit and cache hit-modify signals from the storage device 305 are applied. These signals may be used in conjunction with the timing signals applied to the lines 403, 407 to generate output signals on the lines 411, 416. The lines 411, 416 serve as input terminals for an OR gate 430, which generates a first indicator signal on the line 32 1. Thus, an asserted signal on the line 321 indicates that either a hit or hit-modify signal has been asserted by the storage device 305. While FIG. 4 implements the logic circuit with AND and OR gates, other logic combinations may be used without departing from the inventive concept. One skilled in the art will appreciate that the right side of the circuit 320 functions similarly to the left side, such that an asserted signal on the line 322 indicates that either a hit or hit-modify signal has been asserted by the storage device 310.

Figure 5:
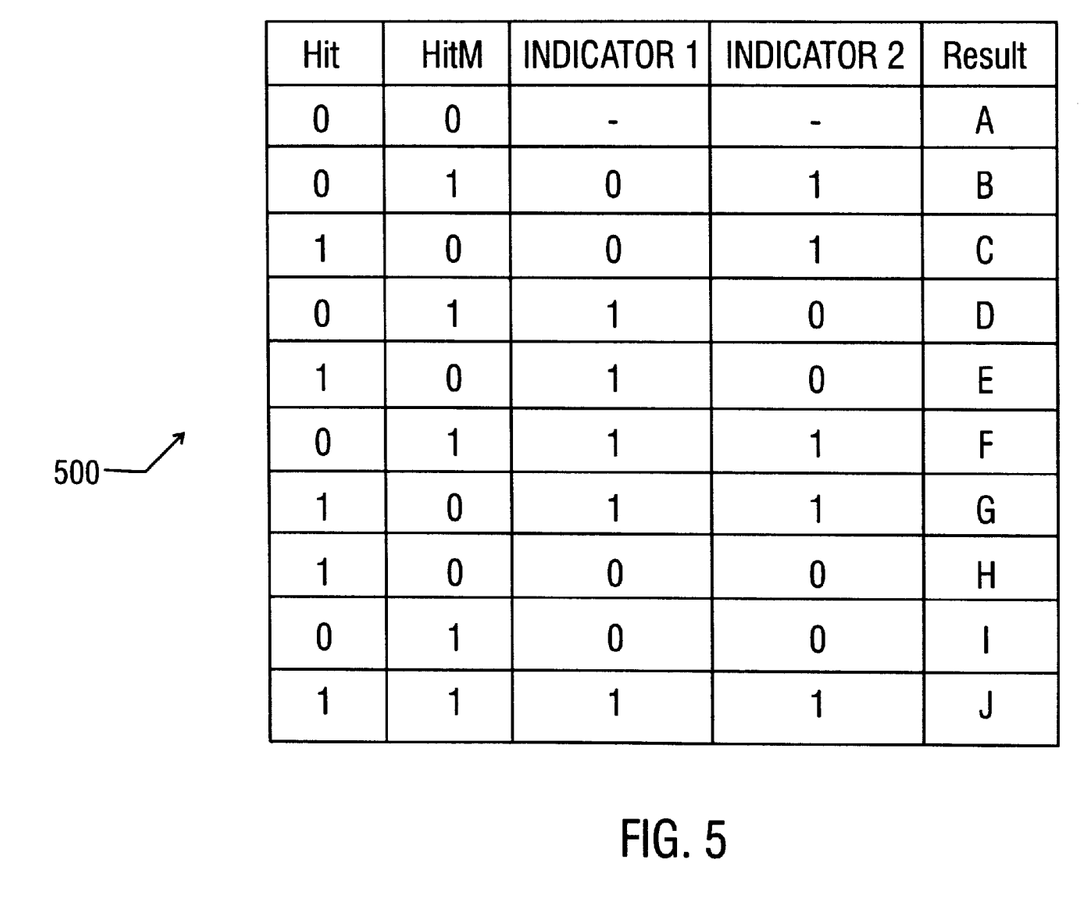
FIG. 5 is a table governing the logic diagram of FIG. 4.

As previously mentioned, the indicator signals applied to the lines 321, 322 and the hit and hit-modify signals applied to the lines 216, 217 may be used to provide additional information. One skilled in the art will appreciate that these signals may be identified by connecting the two additional pins for the indicator signals to a conventional logic analyzer (not shown). In FIG. 5, a table 500 indicates various results that may be determined by analyzing the hit and hit-modify signals in conjunction with the two indicator signals. One skilled in the art will appreciate that, though ones and zeros in this table represent logically high and logically low states, they may be interchanged without departing from the inventive concepts described. The table 500 uses reverse logic such that an asserted state is logically low (shown as a 0) and a deasserted state is a logically high (shown as a 1).

Result A, which may be a snoop stall, is generated when both the hit and hit-modify (HitM) signals are asserted, regardless of the logical states of the two indicator signals. When both hit and hit-modify are asserted, this indicates that the resolving logic 215 needs more time and the snoop operation should be halted until resolution of the problem occurs. Result B, which may indicate a hit in storage device 305, is generated when the hit and indicator 1 signals are asserted. Result B would indicate that the storage device 305 within the processor 300 contains the latest version of the requested data.

Similarly, Result F may be used to indicate that a hit occurred in another processor or from another cache (i.e., not caches 305, 310) within the processor 300. One skilled in the art will appreciate that the table 500 is generated for the processor 300 and that similar tables may be generated for other processors (not shown). By simultaneously analyzing the results from other processors, the processor that contains the copy of the requested data is identified. If analysis of the signals from other processors does not indicate a hit or a hit-modify, then the copy of the data may be in another cache within the processor 300. The remaining results (i.e., results C-E, G-J) may also be used to provide additional insight regarding the processor 300 and the caches 305, 310.

As previously mentioned, though only two storage devices 305, 310 are shown in FIG. 3 and two pins are specified, additional devices and pins may be added without departing from the inventive concepts described herein. Encoding logic may be added as either separate from or internal to the indicator logic 320 to provide a mechanism by which additional storage devices may be monitored without adding additional pins. The specifics regarding additional pins and encoding logic have not been included because their implementation would be within the skill of a person working in the art having the benefit of the instant disclosure.

A method and apparatus in accordance with this invention provides additional information about processors connected to the system bus. In addition, it provides information by which an internal cache that contains a copy of the requested information, within a processor, may be identified. The present invention also enables "debugging" and verification activities to be performed more efficiently by providing a "real-time" result. This benefit may be realized by reducing the amount of time spent on random replacement of a processor within a malfunctioning computer system. By using the table 500, it is possible to quickly identify processors that are functioning correctly. Another benefit to the invention maybe realized in a cost by not replacing a processor that may be operating correctly. The additional information provided by this invention also enables software to be optimized for a given system.

It will be appreciated by those of ordinary skill in the art having the benefit of this disclosure that numerous variations from the foregoing illustration will be possible without departing from the inventive concept described herein. Accordingly, it is the claims set forth below, and not merely the foregoing illustration, which are intended to define the exclusive rights of the invention.

What is claimed is:

1. A processor comprising:
   a first storage device configured to generate a first signal when a copy of a requested entry is located within said first storage device, said first signal being in a first state when said copy is of a first type, said first signal being in a second state when said copy is of a second type;
   a second storage device configured to generate a second signal when a copy of said entry is located within said second storage device, said second signal being in a first state when said copy is of said first type, said second signal being in a second state when said copy is of said second type; and
   a first logic device to generate a first indicator signal in response to receiving said first and second signals, said first indicator signal being representative of the storage device that contains said copy.

2. The processor of claim 1 further comprising a second logic device to generate third and fourth signals in response to receiving said first and second signals, said third and fourth signals being indicative of the type of copy located in said first and second storage devices.

3. The processor of claim 2 wherein said processor is coupled to a third logic device configured to generate a second indicator signal in response to receiving said first indicator signals from multiple processors, said second indicator signal being representative of the processor that contains said copy.

4. The processor of claim 3 further comprising an encoding logic coupled between said first storage device and said first logic device and said second storage device and said first logic device, said encoding logic being designed to encode said first and second signals.

5. The processor of claim 4 wherein said third logic device further comprises decoding logic to decode said first indicator signals.

6. A processor of claim 1 further comprising third and fourth storage devices.

7. The processor of claim 6 wherein said storage devices are static random access cache memories.

8. A central processing unit comprising:
   a first memory device configured to generate first and second signals when a copy of an entry is located within said first memory device, said first signal being generated when said copy is of a first type, said second signal being generated when said copy is of a second type;
   a second memory device configured to generate third and fourth signals when said copy of said entry in said second memory device, said third signal being generated when said copy is of a first type, said fourth signal being generated when said copy is of a second type;
   a first logic device to generate a first indicator signal indicative of the memory device in which the copy is located in response to receiving said first, second, third and fourth signals, said first logic device being coupled to said first and second memory devices; and
   a second logic device to generate memory hit signals in response to receiving said first, second, third, and fourth signals indicative of the type of copy located in said first and second memory devices, said second logic device being couple to said first and second memory devices.

9. The central processing unit of claim 8 wherein said central processing unit is coupled to a third logic device configured to generate a second indicator signal in response to receiving said first indicator signals from multiple central processing units, said second indicator signal being representative of the central processing unit that contains said copy.

10. The central processing unit of claim 9 further comprising an encoding logic coupled between said first memory device and said first logic device and said second memory device and said first logic device, said encoding logic being designed to encode said first, second, third and fourth signals.

11. The central processing unit of claim 10 wherein said third logic device further comprises decoding logic to decode said first indicator signals.

12. The central processing unit of claim 8 wherein said memory devices are static random access cache memories.

13. A central processing unit within a computer system comprising:
   a first cache configured to generate first and second cache signals when one of a first and second type of a copy of an entry is located within said first cache, said first signal being generated when said copy is of a first type, said second signal being generated when said copy is of a second type;
   a second cache configured to generate third and fourth signals when one of a first and second type of a copy of said entry is in said second cache, said third signal being generated when said copy is of first type, said fourth signal being generated when said copy is of said second type;
   a first logic device to generate a first indicator signal in response to receiving said first, second, third and fourth signals, said first logic device being coupled to said first and second caches; and
   a second logic device to generate hit and hit-modify signals in response to receiving said first, second, third, and fourth signals, said second logic device being coupled to said first and second caches and a system bus.

14. The central processing unit of claim 13 wherein said central processing unit is coupled to a third logic device configured to generate a second indicator signal in response to receiving said first indicator signals from multiple central processing units, said second indicator signal being representative of the central processing unit that contains said copy.

15. The central processing unit of claim 13 further comprising a third and a fourth cache.

16. The central processing unit of claim 13 wherein said caches are static random access memories.

17. The central processing unit of claim 13 further comprising an encoding logic coupled between said first cache and said first logic device and said second cache and said first logic device, said encoding logic being designed to encode said first, second, third and fourth signals.

18. The central processing unit of claim 14 wherein said third logic device further comprises decoding logic to decode said first indicator signals.

19. A computer system comprising:
 a first processor including:
  a first storage device configured to generate a first signal when a copy of a requested entry is located within said first storage device;
  a second storage device configured to generate a second signal when a copy of said entry is located within said second storage device;
  a first logic device to generate a third signal to indicate the storage device that contains a copy of said requested entry; and
 a second processor coupled to said first processor by a local bus.

20. The computer system of claim 19 further comprising a second logic device to generate third and fourth signals in response to receiving said first and second signals, said third and fourth signals being indicative of the type of copy located in said first and second storage devices, said third and fourth signals being applied to a system bus.

21. The computer system of claim 20 wherein said first processor is coupled to a third logic device configured to perform error detection on said processors in response to receiving said third signal from each processor.

22. The computer system of claim 21 further comprising an encoding logic coupled between said first storage device and said first logic device and said second storage device and said first logic device, said encoding logic being designed to encode said first and second signals.

23. The computer system of claim 19 wherein said second processor further comprises:
 a first storage device configured to generate a first signal when a copy of a requested entry is located within said first storage device, said first signal being in a first state when said copy is of a first type, said first signal being in a second state when said copy is of a second type;
 a second storage device configured to generate a second signal when a copy of said entry is located within said second storage device, said second signal being in a first state when said copy is of said first type, said second signal being in a second state when said copy is of said second type; and
 a first logic device to generate an indicator signal in response to receiving said first and second signals, said indicator signal being representative of the storage device that contains said copy.

24. The computer system of claim 23 further comprising third and fourth processors coupled to said first and second processors by said local bus.

25. A method for signaling the identity of a storage device in a processor in a digital system comprising:
 generating a common signal on a bus in a digital system;
 generating a first indicator signal in response to receiving a first signal from a first storage device, said first indicator signal indicating the origin of the first storage device; and
 generating a second indicator signal in response to receiving a second signal from a second storage device, said second indicator signal indicating the origin of the second storage device.

26. The method of claim 25 further comprising encoding said first and second signals.

27. The method of claim 26 further comprising decoding said common signal.

28. A processor comprising:
 a first storage device configured to generate a first signal when a copy of a requested entry is located within said first storage device;
 a second storage device configured to generate a second signal when a copy of said requested entry is located within said second storage device; and
 a first logic device to generate a third signal to indicate the storage device that contains a copy of said requested entry.

29. The processor of claim 28 wherein said first signal is in a first state when said copy is of a first type and said first signal is in a second state when said copy is of a second type and said second signal is in a first state when said copy is of a first type and said second signal is in a second state when said copy is of a second type.

30. The processor of claim 29 further comprising a second logic device to generate fourth and fifth signals in response to receiving said first and second signals, said fourth and fifth signals being indicative of the type of copy located in said first and second storage devices, said fourth and fifth signals being applied to a system bus.

31. The processor of claim 30 wherein said processor is coupled to a third logic device configured to generate an indicator signal in response to receiving said third signals from multiple processors, said indicator signal being representative of the processor that contains said copy.

32. The processor of claim 31 further comprising an encoding logic coupled between said first storage device and said first logic device and said second storage device and said second logic device, said encoding logic being designed to encode said first and second signals.

33. The processor of claim 32 wherein said third logic device further comprises a decoding logic to decode said third signals.

34. The processor of claim 28 further comprising third and fourth storage devices.

35. The processor of claim 34 wherein said storage devices are static random access cache memories.

* * * * *

UNITED STATES PATENT AND TRADEMARK OFFICE
CERTIFICATE OF CORRECTION

PATENT NO. : 6,163,830 Page 1 of 1
DATED : December 19, 2000
INVENTOR(S) : Nguyen et al.

It is certified that error appears in the above-identified patent and that said Letters Patent is hereby corrected as shown below:

Column 2,
Line 35, delete "zL", insert -- a --.

Column 5,
Line 5, after "cost", insert -- saving --.

Signed and Sealed this

Twenty-fourth Day of September, 2002

Attest:

Attesting Officer

JAMES E. ROGAN
Director of the United States Patent and Trademark Office